United States Patent
Tseng et al.

(10) Patent No.: US 6,738,833 B2
(45) Date of Patent: May 18, 2004

(54) NETWORK DEVICE HAVING A FLEXIBLE EEPROM FOR SETTING CONFIGURATION SETTINGS

(75) Inventors: Wen-Cheng Tseng, Chutang (TW); Hsin-Min Yeh, Yung-He (TW)

(73) Assignee: Broadcom Corporation, Irvine, CA (US)

( * ) Notice: Subject to any disclaimer, the term of this patent is extended or adjusted under 35 U.S.C. 154(b) by 118 days.

(21) Appl. No.: 10/144,725

(22) Filed: May 15, 2002

(65) Prior Publication Data

US 2003/0196006 A1 Oct. 16, 2003

Related U.S. Application Data (63) Continuation-in-part of application No. 10/119,074, filed on Apr. 10, 2002.

(51) Int. Cl.[7] .......................... G06F 13/10; G06F 13/14
(52) U.S. Cl. .................... 710/8; 710/5; 710/9; 710/10; 709/220; 709/221; 709/222
(58) Field of Search .......................... 710/8, 9, 10, 5; 709/220, 221, 222

(56) References Cited

U.S. PATENT DOCUMENTS

| | | | |
|---|---|---|---|
| 5,423,015 A | | 6/1995 | Chung |
| 5,644,784 A | | 7/1997 | Peek |
| 5,699,350 A | * | 12/1997 | Kraslavsky ............... 370/254 |
| 5,727,126 A | | 3/1998 | Eichfeld et al. |
| 5,794,033 A | | 8/1998 | Aldebert et al. |
| 5,909,686 A | | 6/1999 | Muller et al. |
| 5,938,764 A | * | 8/1999 | Klein ............................ 713/1 |
| 6,061,351 A | | 5/2000 | Erimli et al. |
| 6,199,192 B1 | | 3/2001 | Marquez et al. |
| 6,292,707 B1 | * | 9/2001 | Hair et al. ...................... 700/97 |
| 6,349,304 B1 | * | 2/2002 | Boldt et al. ................. 707/102 |
| 6,480,235 B1 | * | 11/2002 | Sugawa et al. ............. 348/554 |
| 6,553,489 B1 | * | 4/2003 | Osler et al. .................... 713/1 |

FOREIGN PATENT DOCUMENTS

| | | |
|---|---|---|
| WO | 99/00936 | 1/1999 |

OTHER PUBLICATIONS

Ian Page, "Reconfigurable Processor Architectures," Microprocessors and Microsystems, IPC Business Press Ltd, London Great Britain, vol. 20, No. 3, May 1, 1996, pp. 185–196.

* cited by examiner

*Primary Examiner*—Rehana Perveen
(74) *Attorney, Agent, or Firm*—Squire, Sanders & Dempsey L.L.P.

(57) ABSTRACT

A method for flexibly configuring default values of a network device and a network device using such flexible configuration method is described. First, it is determined whether the default values are obtained through a microprocessor interface or a memory interface. When it is determined that the default values are obtained through the memory interface, a header is received from a memory through the memory interface it is determined from the header whether any default value of the network device should be updated. If the network device should be updated, then at least one configuration instruction is fetched from the memory and the at least one configuration instruction is interpreted. A register default value of the default values is changed, corresponding to the interpreted at least one configuration instruction. Alternatively, when it is determined that the default values are obtained through the microprocessor interface, the default values are changed according to data received through the microprocessor interface.

21 Claims, 6 Drawing Sheets

Downloadable Register

| | 15 | 8 | 7 | 0 |
|---|---|---|---|---|
| 00 | FIRST | | ENTRY | |
| 01 | ADDRESS( CP ) | | Data Entry Num | |
| 02 | DATA | | DATA | |
| 03 | ADDRESS(OA) | | Data Entry Num | |
| 04 | DATA | | DATA | |
| 05 | DATA | | DATA | |
| 06 | DATA | | DATA | |
| 07 | DATA | | DATA | |
| ⋮ | ⋮ | | ⋮ | |
| 2F | ADDRESS | | Data Entry Num | |
| 3F | DATA | | DATA | |

NETWORK DEVICE HAVING A FLEXIBLE EEPROM FOR SETTING CONFIGURATION SETTINGS

REFERENCE TO RELATED APPLICATIONS

This application is a Continuation-in-Part of U.S. application Ser. No. 10/119,074, filed Apr. 10, 2002 now pending and claims priority under 35 U.S.C. §120 to that application. The contents of that application are hereby incorporated by reference.

BACKGROUND OF THE INVENTION

1. Field of Invention

The present invention relates to a network device having an apparatus for selectively configuring the network device using an Electrically Erasable Programmable Read Only Memory (EEPROM). More specifically, the network device is able to use dynamic configuration settings in the EEPROM interface, that increases flexibility, has fewer limitations and is a low cost alternative.

2. Description of Related Art

Many types of network devices are necessary to allow a network to function properly. These network devices are composed of chips, with these chips allowing for the control and monitoring of data through the network device. Chip vendors may pre-set some register default values inside a network device, such as a switch/hub chip, to provide a low cost switch and hub application. That means it is not necessary for system integrators to change the internal register default values to build a workable system. The preconfigured chips allow for the network devices to be setup and to function quickly for a majority of system integrators.

In some cases, these pre-set register default values might not suitable for some system integrators. Chip vendors should provide some methods so that system integrators can change some register values instead of using default values. Some chip vendors will provide a microprocessor interface (SPI, I2C, or PCI) to allow system integrators to change all write-able registers. However, built-in microprocessors on the chip boards increase system costs and may not be needed by many customers.

Another alternative method to allow users to change the default values is to provide an Electrically Erasable Programmable Read Only Memory (EEPROM) interface. With an EEPROM interface, a system integrator can change some register default values using a very low cost EEPROM. Most chip vendors have provided an EEPROM interface for a low cost switch and hub application.

Figure 1:
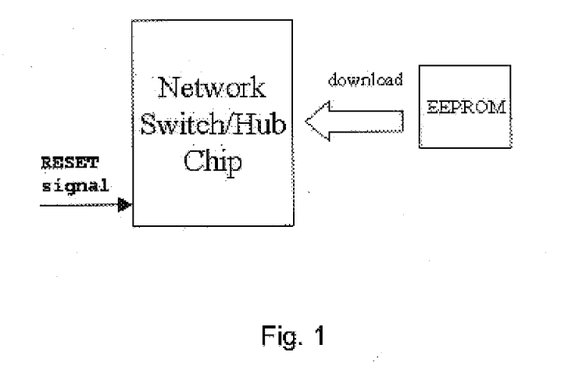
FIG. 1 illustrates a network device that interfaces with an EEPROM.

FIG. 1 provides as an example of a low cost preprogrammed EEPROM that is used to change some default values of a network switch/hub chip. When the external control signal (RESET) goes to inactive, network switch/hub chip start to change its some register default values via downloading the contents of EEPROM. And then network switch/hub chip start its normal operation after the download phase had been finished.

Figure 2:
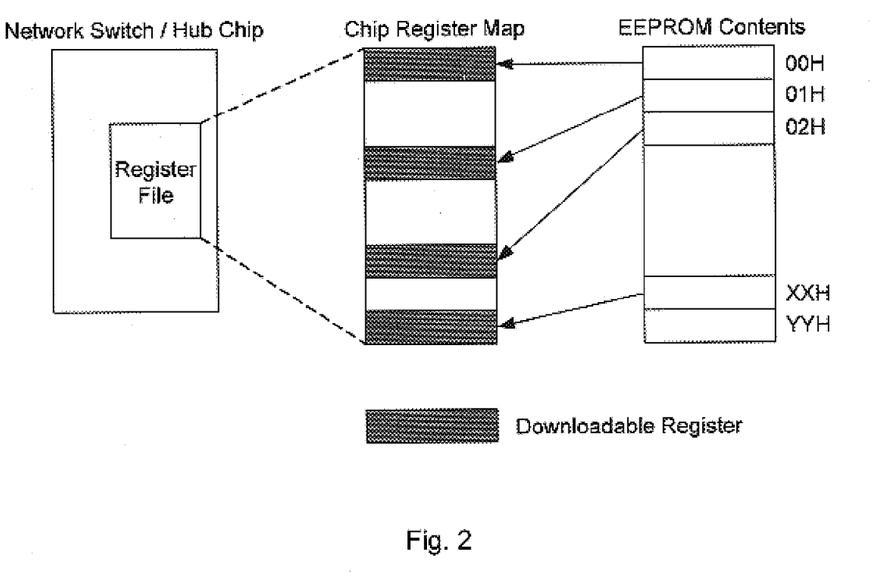
FIG. 2 illustrates the how the contents of the EEPROM map into register file using the chip register map.

When the RESET signal goes to inactive, the network switch/hub chip starts to fetch data from external EEPROM automatically. Most of the network switch/hub chips will fetch data from EEPROM address 00h (the first entry), and fetch the other data in sequence. In order to change some register default values or set chip configuration, the chip vendor will provide a register set (a part of chip register file) which are downloadable from EEPROM. Each entry of EEPROM is pre-defined and will directly map to one or more entries of a register set inside network switch/hub chip as described in FIG. 2.

However, in this kind of scenario, two major drawbacks may occur. First, different system integrators may want to change different registers. And it is not necessary for system integrators to configure all downloaded register. However, even if system integrators only want to configure some of chip downloadable registers, it is still necessary to fill all the contents of downloadable register set into EEPROM. Secondly, some register default values of network switch/hub chip are change-able via microprocessor interface, but they are not downloadable via EEPROM. In this case, the only way for system integrator to act is to build a microprocessor on the PCB instead of using a very low cost EEPROM.

Thus, there is a need for a mechanism and a process to be used with a network device that allows for a system integrator to make changes to default settings of the network device that is not costly or cumbersome. Additionally, there is also a need for such a mechanism to change only certain defaults on a network device without the limitations imposed by the prior art processes and devices. Also, there is a need for a system that can use multiple inputs to allow for changes to the default values of the network device.

SUMMARY OF THE INVENTION

It is an object of this invention to overcome the drawbacks of the above-described conventional network devices and methods. The present invention provides for a new approach for chip and network component vendors to provide system integrators a dynamic configuration using a low cost EEPROM. With this approach, system integrators will have flexibility to change the default values of all configurable registers inside a network device, such as a switch/hub chip or components on a PC board. A network device will be able to update configuration setting either through the low cost EEPROM or though a microprocessor interface.

According to one aspect of this invention, a method for configuring default values of a network device is disclosed. First, it is determined whether the default values are obtained through a microprocessor interface or a memory interface. When it is determined that the default values are obtained through the memory interface, a header is received from a memory through the memory interface it is determined from the header whether any default value of the network device should be updated. If the network device should be updated, then at least one configuration instruction is fetched from the memory and the at least one configuration instruction is interpreted. A register default value of the default values is changed, corresponding to the interpreted at least one configuration instruction. Alternatively, when it is determined that the default values are obtained through the microprocessor interface, the default values are changed according to data received through the microprocessor interface.

Additionally, the method may further include monitoring a reset signal to determine whether the default values of the network device should be updated. In addition, the memory and memory interface can be an EEPROM and an EEPROM interface. Also, the step of determining from the header whether any default value of the network device should be updated can be a step of determining from the header a number of the default values of the network device that should be updated. In that case, the number of configuration instructions fetched from the EEPROM is equal to the number of the default values of the network device that should be updated. In addition, a key value may be determined from the header and be compared with a magic number pre-defined inside network device to determine whether any default value of the network device should be updated. Also, the at least one configuration instruction can be a plurality of configuration instructions and the configuration instructions are repeatedly fetched from the EEPROM until all of the plurality of configuration instructions have been fetched.

In another aspect of the invention, a network device, having default values that are flexibly configurable, is also disclosed. The device includes a microprocessor interface, an memory interface, a register file containing the default values for the network device, and a configuration instruction interpreter. The memory interface is configured to receive configuration instructions, with each configuration instruction of the configuration instructions being composed of an address index and a corresponding value, wherein the configuration instruction interpreter is configured to interpret the received configuration instructions such that the corresponding values are mapped corresponding default values of the register file, and wherein the network device is configurable to set default values based on data received through either the microprocessor interface and the memory interface.

Also, the configuration instruction interpreter may be configured to monitor a reset signal to determine if the default values should be updated or be configured to determine from the header a number of the default values of the network device that should be updated. In addition, the memory interface can be an EEPROM interface. Additionally, the configuration instruction interpreter may be configured to fetch a number of configuration instructions from the EEPROM equal to the number of the default values of the network device that should be updated. Also, the configuration instruction interpreter may be configured to receive a header from the EEPROM interface containing a key value from and configured to compare the key value with a pre-defined magic number to determine whether any default value of the default values should be updated. Also, the network device may further include a controller for setting one of the microprocessor interface and the EEPROM interface through which data is received to change the default values.

These and other objects of the present invention will be described in or be apparent from the following description of the preferred embodiments.

BRIEF DESCRIPTION OF THE DRAWINGS

For the present invention to be easily understood and readily practiced, preferred embodiments will now be described, for purposes of illustration and not limitation, in conjunction with the following figures.

DETAILED DESCRIPTION OF PREFERRED EMBODIMENTS

Figure 3:
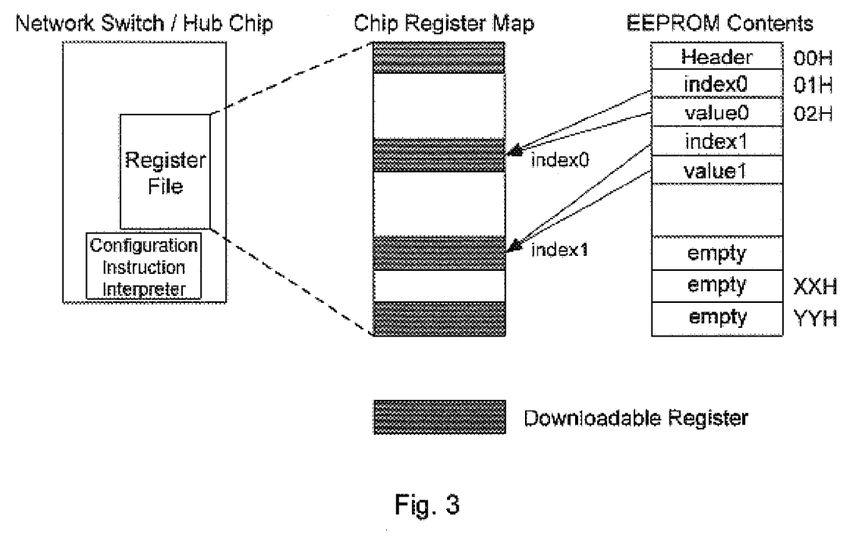
FIG. 3 illustrates an embodiment of the present invention where the EEPROM has a dynamic configuration.

The present invention is directed to changing the contents of the EEPROM used in a network device to a set of configuration instructions instead of configuration values only. Each configuration instruction can be composed of address index and its corresponding desired value. An indirect mapping mechanism is used to map EEPROM contents to their corresponding registers inside network switch/hub chip instead of original direct mapping method. Besides, a header, encapsulated with a specific key value and total number of configuration instructions, should be filled in the first entry of EEPROM content. This header is designed as an identifier during EEPROM download cycle. One embodiment of the present invention is illustrated in FIG. 3.

To achieve this flexible configuration apparatus, the network device, inclusive of such a switch/hub chip, should have a built-in circuit (called, in this example, Configuration Instruction Interpreter, CII) inside the chip to interpret configuration instruction. When RESET signal goes to inactive, the CII of network switch/hub chip start to fetch header (the first entry) from external EEPROM automatically, then the key is obtained. If the key value is not matched with the number pre-defined inside network device, it indicates that it is not necessary to change any chip default value, and download sequence might be skipped. While key value is matched with the pre-defined number, the CII continuously fetches configuration instruction from EEPROM, and changes the corresponding (defined in address index of configuration instruction) register default value to the desired value by interpreting instruction. This process will be repeated until all instruction download completely. Additionally, since the number of default values needing to be updated is determined from the start, the time needed to perform the updated is less than the equivalent updating performed in the prior art methods and systems.

Figure 4:
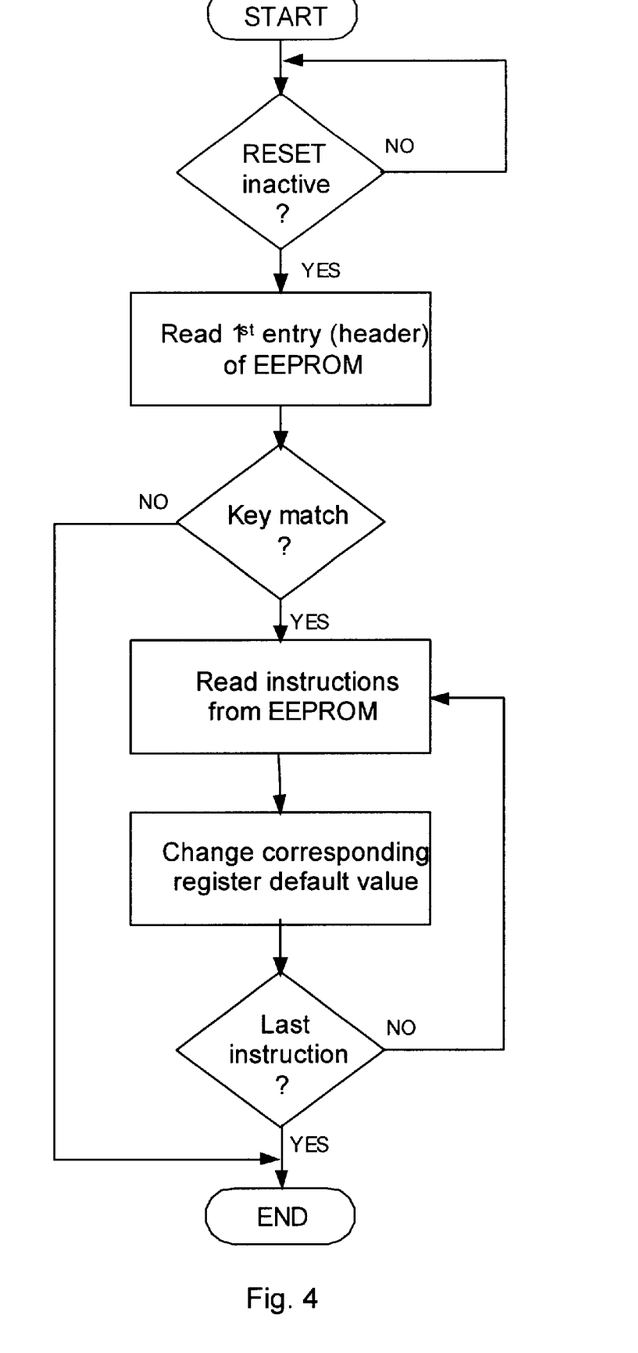
FIG. 4 illustrates a process of changing the defaults of an example of the system of the present invention.

This process, described above, is illustrated in FIG. 4. In this example, the process continually checks to see if the RESET signal is set to inactive. Once the RESET signal is inactive, the header of the EEPROM is read. A key is determined and compared with the pre-defined number inside the chip. If there is a match, then instructions are read from the EEPROM and the corresponding register default value is changed. If the immediately previous instruction just read was the last, then, in this example, the process ends. If that previous instruction was not the last, then the next instruction is read from the EEPROM and the default values of the corresponding register are changed.

With this new configuration instruction of EEPROM content, it is not necessary for vendor of the network device to provide a pre-defined downloadable set. Furthermore, a system integrator could use a very cost EEPROM to change any downloadable register default value. The system integrator could decide which registers he wants to change the default values without too much limitation. Additionally, the system integrator also could decide how many registers he wants to change. Such that, less capacity EEPROM could be used due to few register default values changed.

Figure 5:
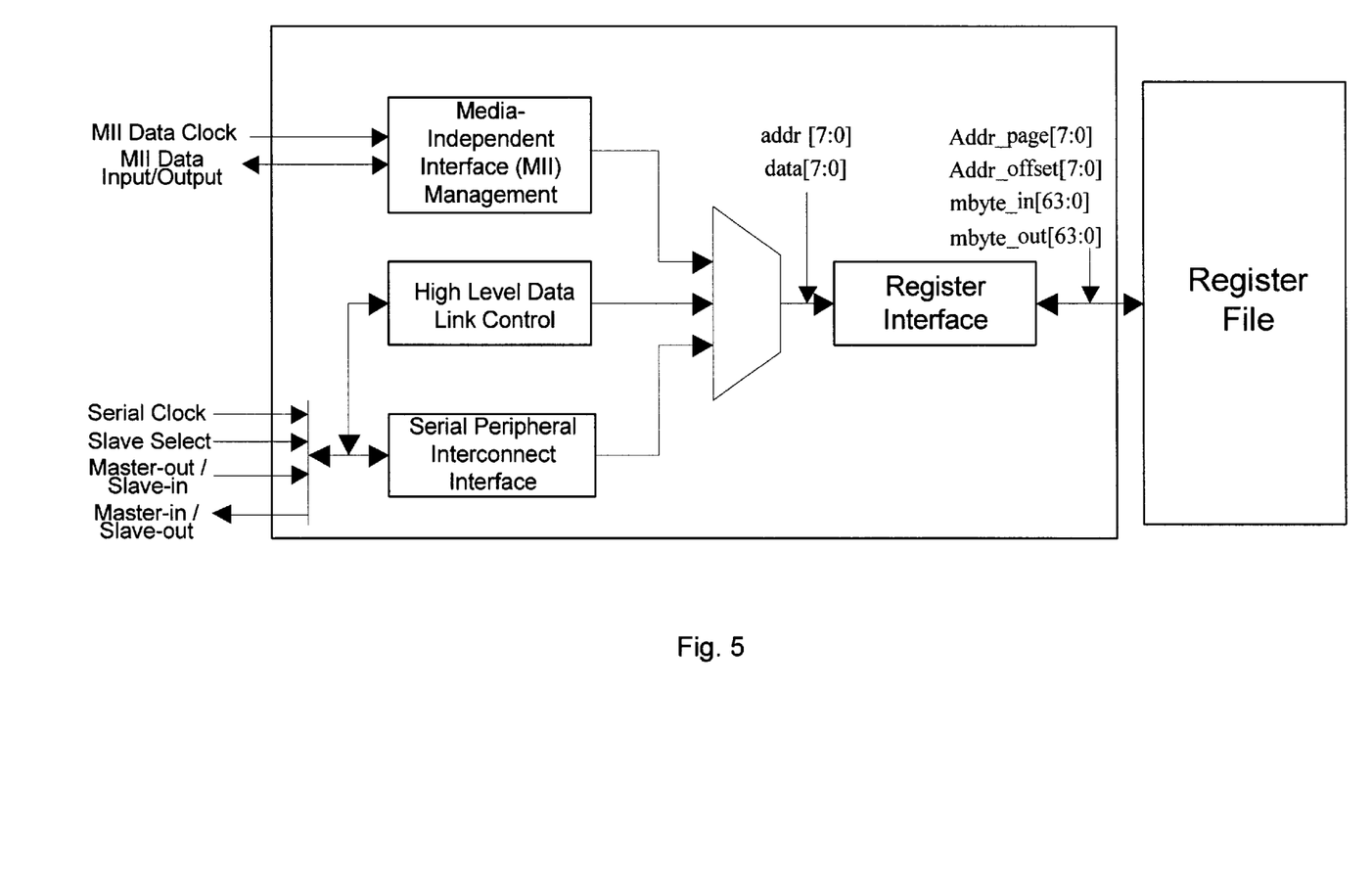
FIG. 5 illustrates a network device without an EEPROM interface applicable to one embodiment of the present invention.

The EEPROM system and method discussed above increases the versatility of the network devices, as compared to such devices without an EEPROM interface. A portion of a network device without such an EEPROM interface is schematically illustrated in FIG. 5. The network device of this example is a low-cost switch that can be used to perform high-speed switching, including packet buffers, transceivers, media access controllers, address management and non-blocking switch controller. Other configurations are possible and the present invention is not limited to the network device illustrated in FIG. 5. Since the network device is designed for cost sensitive unmanaged markets and requires only a low cost micro controller to initialize and configure the device, the use of above-described EEPROM to set configuration settings is particularly attractive.

The portions of such a network switch illustrated in FIG. 5 include a Media-Independent Interface (MII) management section and a Serial Peripheral Interconnect (SPI) Interface section. The device sends and receives data through these interfaces and communicates with the register interface, to read and write to a register file. As discussed above, if a network device has only the microprocessor interfaces, this reduces versatility and can increase cost.

Figure 6:
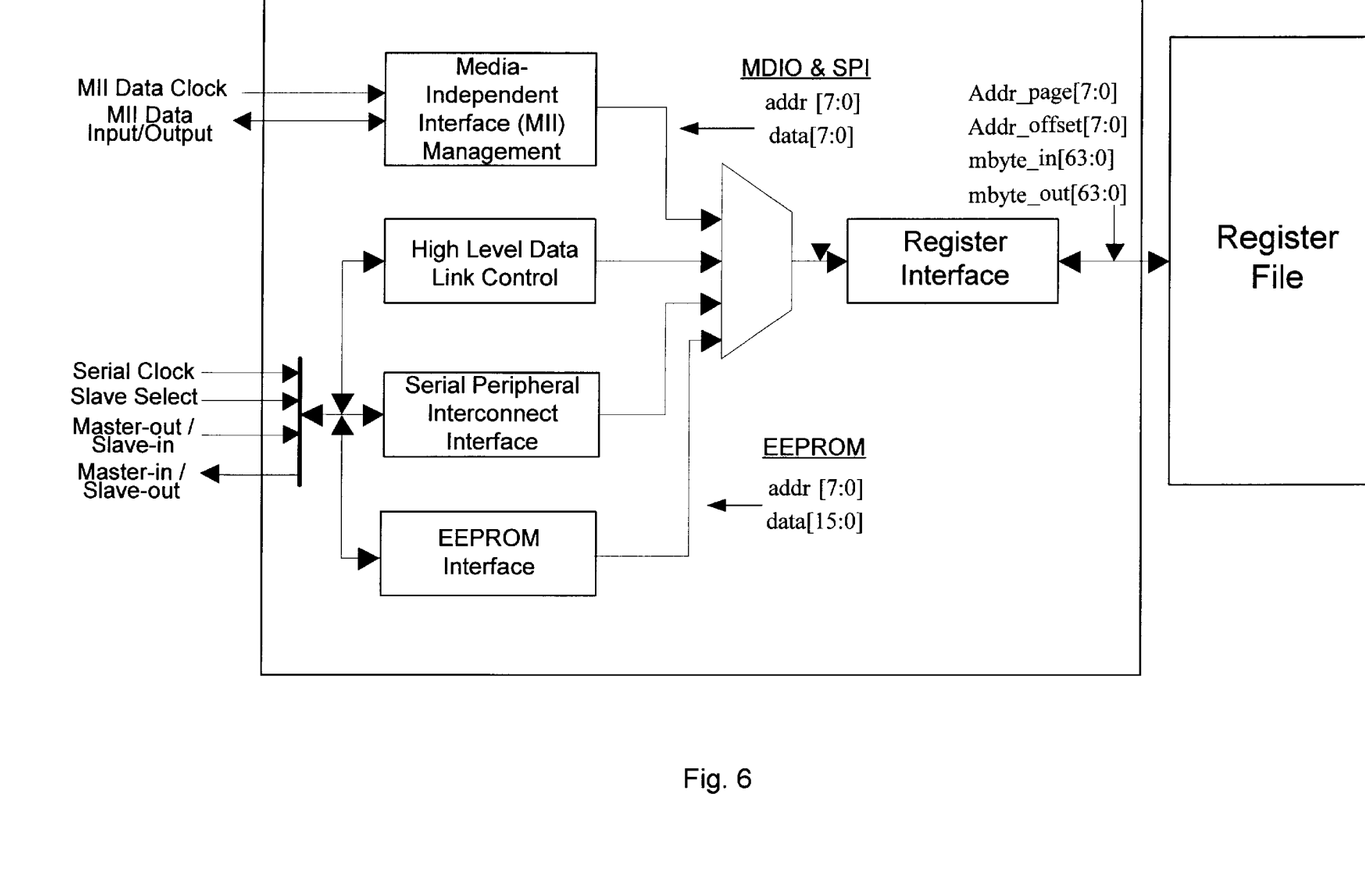
FIG. 6 illustrates a network device with an EEPROM interface according to one embodiment of the present invention.
Figure 7:
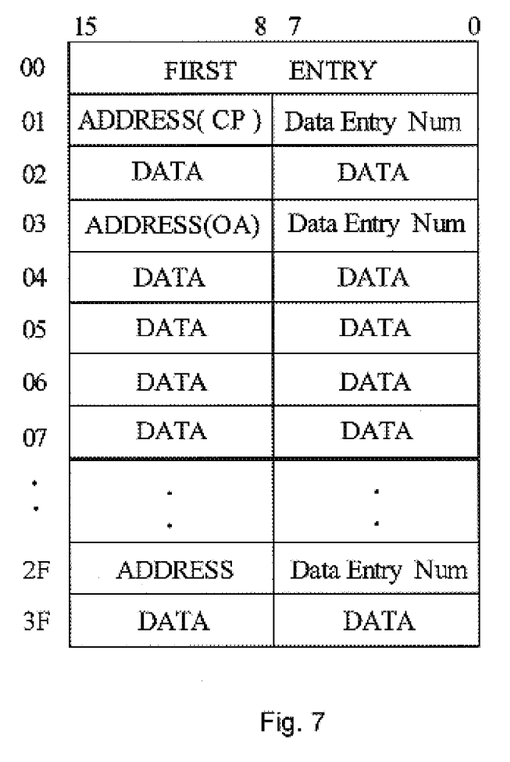
FIG. 7 illustrates the contents of the EEPROM used in one embodiment of the present invention.

Alternatively, the device can have an EEPROM interface. Portions of such a network device are illustrated in FIG. 6. This allows for the device to update the default values of the network device using either the EEPROM interface or SPI interface. In a preferred embodiment, the network switch cannot co-exist in both the EEPROM and SPI modes. The single mode operation does not require the resolution of conflicting instructions to the register file that can occur if both modes were operational With respect to the above embodiment of the network device, an example of a configuration of the EEPROM contents is illustrated in FIG. 7. The first entry in the EEPROM contains a key that determines the operation of the EEPROM. The first entry also contains a speed select bit and provides a total number of entries in the EEPROM. Next, an address number is provided with a specific number provided for a change page and other numbers representing an offset address. The data entry number can be, in this example, one of four numbers: 1 for an 8-/16-bit value, 2 for a 24-/32-bit value, 3 for a 40-/48-bit value and 4 for a 56-/64-bit value, with the last being a maximum. Data follows each address tag.

In general, the network device does not co-exist in both the EEPROM and the microprocessor modes. As such that, the first thing to be determined is which mode is applied to this network device after the RESET signal goes to inactive. It is necessary to have another control pin (that can be called a STRAP pin) to indicate which configuration mode is selected. This process is illustrated in FIG. 8.

Figure 8:
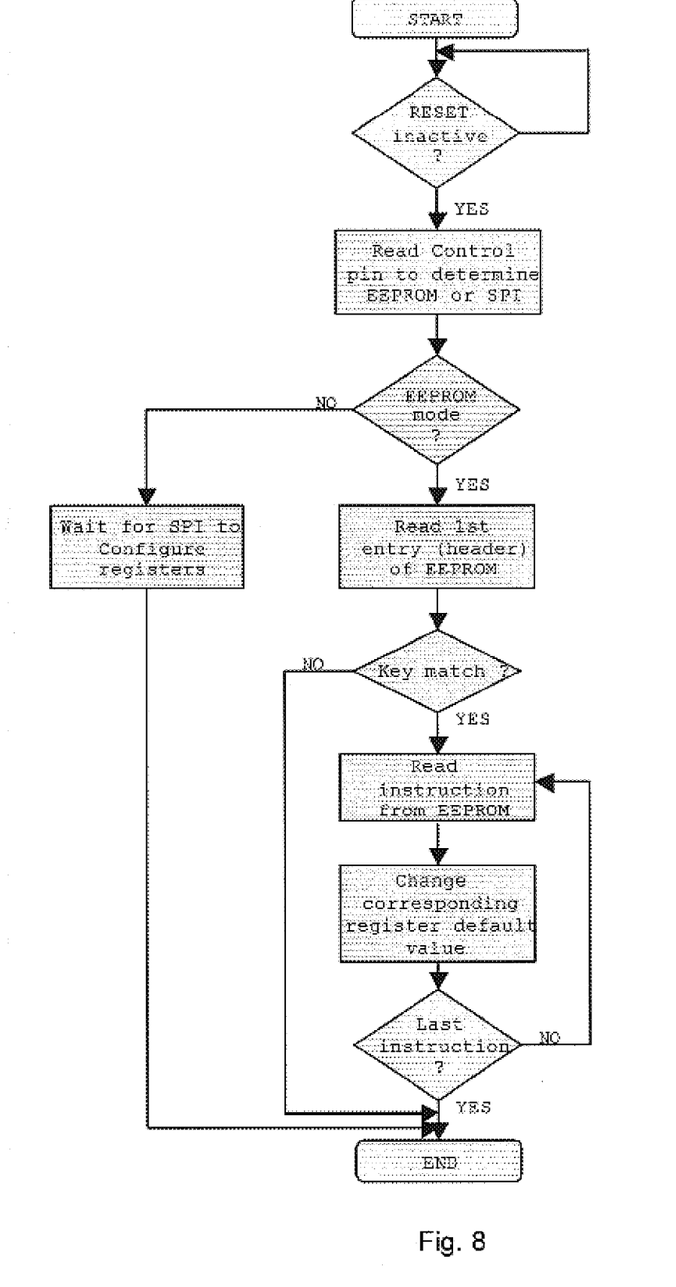
FIG. 8 illustrates a process of changing the defaults of an example of the network device of the present invention.

In FIG. 8, the network device checks to determine if the RESET signal has been set to inactive. If it has, then a control pin is read to determine if either the EEPROM interface or the SPI interface is selected. If the control pin indicates that the SPI interface is selected, then the network device waits for a microprocessor to configure the registers over the SPI interface. Otherwise, if the EEPROM interface is selected, then the rest of the process steps are carried out. These steps are similar to those illustrated in FIG. 4 and their description need not be repeated.

When the EEPROM mode is selected, the network chip is a MASTER and external EEPROM is a SLAVE. That is all control signals are driven from chip to EEPROM. In such a mode, all registers in the network device are configurable. When microprocessor mode is selected, the network device is a SLAVE and the external microprocessor is a MASTER. That is, all control signals are driven from microprocessor to chip. All registers in the network device are configurable and read-able.

Since the EEPROM mode and the microprocessor or SPI mode do not coexist, in this example, it is possible to let the EEPROM and the SPI interfaces share the same pins to save the pin-count. This sharing of pins is another cost advantage of the network device according to the present invention.

As such, the network device embodying the present invention would have numerous benefits over the prior art devices. The network device allows for a system integrator to make changes to default settings of the network device that is not costly or cumbersome. Additionally, only certain defaults on a network device may be changed without the limitations imposed by the prior art processes and devices. Also, the network device allows for the use of multiple inputs to allow for changes to the default values of the network device.

One configuration of the invention is, in one embodiment, embodied on a semiconductor substrate, such as silicon, with appropriate semiconductor manufacturing techniques and based upon a circuit layout which would, based upon the embodiments discussed above, be apparent to those skilled in the art. A person of skill in the art with respect to semiconductor design and manufacturing would be able to implement the various modules, interfaces, and components, etc. of the present invention onto a single semiconductor substrate, based upon the architectural description discussed above. It would also be within the scope of the invention to implement the disclosed elements of the invention in discrete electronic components, thereby taking advantage of the functional aspects of the invention without maximizing the advantages through the use of a single semiconductor substrate.

Although the invention has been described based upon these preferred embodiments, it would be apparent to those of skilled in the art that certain modifications, variations, and alternative constructions would be apparent, while remaining within the spirit and scope of the invention. In order to determine the metes and bounds of the invention, therefore, reference should be made to the appended claims.

What is claimed is:

1. A method for configuring default values of a network device, comprising:
    determining whether the default values are obtained through a microprocessor interface or a memory interface;
    when it is determined that the default values are obtained through the memory interface, performing the steps of:
        receiving a header from a memory through the memory interface;
        determining from the header whether any default value of the network device should be updated;
        fetching at least one configuration instruction from the memory when the determining step determines that the network device should be updated;
        interpreting said at least one configuration instruction; and
        changing a register default value of said default values corresponding to said interpreted at least one configuration instruction; and
    when it is determined that the default values are obtained through the microprocessor interface, changing said default values according to data received through the microprocessor interface.

2. The method according to claim 1, wherein said method further comprises monitoring a reset signal to determine whether the default values of the network device should be updated.

3. The method according to claim 1, wherein said step of determining from the header whether any default value of the network device should be updated comprises determining from the header a number of the default values of the network device that should be updated.

4. The method according to claim 3, wherein said step of fetching at least one configuration instruction from the memory comprises fetching a number of configuration instructions from the memory equal to the number of the default values of the network device that should be updated.

5. The method according to claim 1, wherein said step of determining from the header whether any default value of the network device should be updated comprises determining a key value from said header and comparing said key value with a number pre-defined inside network device to determine whether any default value of the network device should be updated.

6. The method according to claim 1, wherein said at least one configuration instruction comprises a plurality of configuration instructions and the step of fetching at least one configuration instruction from the memory is repeated until all of the plurality of configuration instructions have been fetched.

7. The method according to claim 1, wherein said memory interface comprises an EEPROM interface and the step of receiving a header from a memory through the memory interface comprises receiving a header from an EEPROM through the EEPROM interface.

8. A network device, having default values that are flexibly configurable, comprising:
 a microprocessor interface;
 a memory interface;
 a register file containing the default values for the network device; and
 a configuration instruction interpreter;
 wherein the memory interface is configured to receive configuration instructions, with each configuration instruction of said configuration instructions being composed of an address index and a corresponding value, wherein the configuration instruction interpreter is configured to interpret the received configuration instructions such that the corresponding values are mapped corresponding default values of the register file, and wherein the network device is configurable to set default values based on data received through either the microprocessor interface and the memory interface.

9. The network device according to claim 8, wherein said configuration instruction interpreter is configured to monitor a reset signal to determine if the default values should be updated.

10. The network device according to claim 8, wherein said configuration instruction interpreter is configured to determine from the header a number of the default values of the network device that should be updated.

11. The network device according to claim 10, wherein said configuration instruction interpreter is configured to fetch a number of configuration instructions from the memory equal to the number of the default values of the network device that should be updated.

12. The network device according to claim 8, wherein the configuration instruction interpreter is configured to receive a header from the memory interface containing a key value from and configured to compare said key value with a pre-defined number to determine whether any default value of said default values should be updated.

13. The network device according to claim 8, further comprising a controller for setting one of the microprocessor interface and the memory interface through which data is received to change the default values.

14. The network device according to claim 8, wherein said memory interface comprises an EEPROM interface and the EEPROM interface is configured to receive configuration instructions from an EEPROM.

15. A network device, comprising:
 means for determining whether the default values are obtained through a microprocessor interface or a memory interface;
 means for receiving a header from a memory through the memory interface;
 means for determining from the header whether any default value of the network device should be updated;
 means for fetching at least one configuration instruction from the memory when the determining step determines that the network device should be updated;
 means for interpreting said at least one configuration instruction;
 means changing a register default value of said default values corresponding to said interpreted at least one configuration instruction; and
 means for changing said default values according to data received through the microprocessor interface;
 wherein said means for changing said default values according to data received through the microprocessor interface is configured to change the default values when the means for determining whether the default values are obtained through a microprocessor interface or a memory interface determines that the default values are to be obtained through a microprocessor interface.

16. The network device according to claim 15, further comprises means for monitoring a reset signal to determine whether the default values of the network device should be updated.

17. The network device according to claim 15, wherein said means for determining from the header whether any default value of the network device should be updated comprises means for determining from the header a number of the default values of the network device that should be updated.

18. The network device according to claim 17, wherein said means for fetching at least one configuration instruction from the memory comprises means for fetching a number of configuration instructions from the memory equal to the number of the default values of the network device that should be updated.

19. The network device according to claim 15, wherein said means for determining from the header whether any default value of the network device should be updated comprises means for determining a key value from said header and means for comparing said key value with a number pre-defined inside network device to determine whether any default value of the network device should be updated.

20. The network device according to claim 15, wherein said at least one configuration instruction comprises a plurality of configuration instructions and the means for fetching at least one configuration instruction from the memory is configured to repeatedly fetch configuration instructions until all of the plurality of configuration instructions have been fetched.

21. The network device according to claim 15, wherein said means for receiving a header from a memory through the memory interface comprises means for receiving a header from an EEPROM through an EEPROM interface.

* * * * *